(12) United States Patent
Shani

(10) Patent No.: US 6,259,834 B1
(45) Date of Patent: Jul. 10, 2001

(54) DENSE TREE OPTICAL SWITCH NETWORK

(75) Inventor: Yosi Shani, Maccabbim (IL)

(73) Assignee: Lynx Photonic Networks Inc., Agoura Hills, CA (US)

( * ) Notice: Subject to any disclaimer, the term of this patent is extended or adjusted under 35 U.S.C. 154(b) by 0 days.

(21) Appl. No.: 09/435,693

(22) Filed: Nov. 8, 1999

Related U.S. Application Data

(60) Provisional application No. 60/145,978, filed on Jul. 29, 1999.

(51) Int. Cl.[7] ..................................... G02B 6/26
(52) U.S. Cl. ........................ 385/17; 385/16; 385/24; 385/40; 385/45
(58) Field of Search ..................... 385/14, 16, 17, 385/24, 31, 37, 39, 40, 45, 20, 21

(56) References Cited

U.S. PATENT DOCUMENTS

| | | |
|---|---|---|
| 4,787,692 | 11/1988 | Spanke . |
| 4,852,958 | 8/1989 | Okuyama et al. . |
| 6,049,642 | * 4/2000 | Nakamura et al. ............... 385/16 |

OTHER PUBLICATIONS

Jajszczyk et al, "Tree–Type Switching Networks", *IEEE Network*, 9(1): 10–16, 1995.
Granestrand et al, "Pigtailed Tree–Structured 8×8 LiNbO$_3$ Switch Matrix with 112 Digital Optical Switches", *IEEE Photonics Technol. Letters*, 6(1): 71–73, 1994.
NakaJima, H., "Development on Guided–Wave Switch Arrays", *IEICE Trans. Electron.*, E82–C(2): 297–304, 1999.
Okayama et al, "Optical Switch Matrix With Simplified N×N Tree Structure", *J. Lightwave Technol.*, 7(7): 1023–1028, 1989.
Kato et al, Hybrid Integrated 4×4 Optical Matrix Switch Module on Silica Based Planar Waveguide Platform, *IEICE Trans. Electron.*, E–82–C(2): 305–311, 1999.
Spanke, RA, "Architectures for Guided–Wave Optical Space Switching Systems", *IEEE Communications Mag.*, 25(5): 42–48, 1987.
Spanke RA, "Architectures for Large Nonblocking Optical Space Switches", *IEEE J. Quantum Electronics*, QE–22(6): 964–967, 1986.

* cited by examiner

*Primary Examiner*—Hemang Sanghavi
(74) *Attorney, Agent, or Firm*—Mark M. Friedman

(57) ABSTRACT

An optical switch network, for connecting P switch input waveguides to Q switch output waveguides. The switch input waveguides enter a branching subnetwork consisting of a plurality of branching cascades. In each branching cascade, an array of 1×2 splitters connects the input waveguides of the cascade to the output waveguides of the cascade, and the output waveguides of the cascade cross within the cascade so that output waveguides that connect to the same switch input waveguide emerge from the cascade P output waveguides apart. The output waveguides of the branching subnetwork connect directly to 2×1 combiners of a combining subnetwork that connects the output waveguides of the branching subnetwork to the Q switch output waveguides. The network architecture is reversible, by exchanging the roles of the input and output waveguides and the roles of the splitters and the combiners. Each splitter has a passive state, in which the input optical signals are directed to both outputs, and two active states, in which the input optical signals are directed to only one or the other of the two outputs. Similarly, each combiner has a passive state, in which the input optical signals are superposed in output, and two active states, in which only optical signals from one or another of the inputs is directed to output. Preferably, the splitters and combiners are optical switches having normalized coupling lengths equal to odd multiples of ½.

43 Claims, 9 Drawing Sheets

DENSE TREE OPTICAL SWITCH NETWORK

This application claims benefit to U.S. provisional application No. 60/145,978 filed Jul. 29, 1999.

FIELD AND BACKGROUND OF THE INVENTION

The present invention relates to optical switch networks and, more particularly, to a strictly nonblocking tree network architecture with low crosstalk and efficient use of space.

Tree networks are reviewed in Andrzej Jajszczyk and H. T. Mouftah, "Tree-type photonic switching networks", *IEEE Network*, vol. 9 no. 1 pp. 10–16 (1995), which is incorporated by reference for all purposes as if fully set forth herein. FIG. 1 shows the high-level layout of a generic tree network for connecting P input waveguides 12 to Q output waveguides 14. Input waveguides 12 enter a branching region 16, where an array of 1×2 splitters connects input waveguides 12 to PQ branching region output waveguides 22. Output waveguides 14 emerge from a combining region 20 where an array of 2×1 combiners connects output waveguides 14 to PQ combining region input waveguides 24. Waveguides 22 and 24 are connected in an interconnection region 18 in a manner that allows any input waveguide 12 to be connected to any combination of output waveguides 14.

FIG. 2 shows a classical 4×4 tree network architecture, for connecting four input waveguides 12 to four output waveguides 14. The four input waveguides 12 are indexed serially by binary indices 00, 01, 10 and 11. Similarly, the four output waveguides 14 are indexed serially by binary indices 00, 01, 10 and 11.

Input waveguides 12 enter a branching region 16 that includes two branching cascades 30 of 1×2 splitters 26. Input waveguides 12 are the input waveguides of the first branching cascade 30. The eight output waveguides of the first branching cascade 30 are indexed, relative to input waveguides 12, in a manner that is referred to herein as "least significant inserted bit order". For each 1×2 splitter of the first branching cascade 30, the index of the upper output waveguide is obtained by appending a zero to the index of the input waveguide, and the index of the lower waveguide is obtained by appending a one to the index of the input waveguide. The eight output waveguides of the first branching cascade 30 are the eight input waveguides of the second branching cascade 30, and the sixteen output waveguides of the second branching cascade 30 are indexed relative to the eight input waveguides of the second branching cascade 30 in least significant inserted bit order.

Similarly, output waveguides 14 emerge from a combining region 20 that includes two combining cascades 32 of 2×1 combiners 28. Output waveguides 14 are the output waveguides of the second combining cascade 32. The eight input waveguides of the second combining cascade 32 are indexed, relative to output waveguides 14, in least significant inserted bit order. The eight input waveguides of the second combining cascade 32 are the eight output waveguides of the first combining cascade 32, and the sixteen input waveguides of the first combining cascade 32 are indexed relative to the eight output waveguides of the first combining cascade 32 in least significant inserted bit order.

Each of the sixteen output waveguides of branching region 16 connects to one of the sixteen input waveguides of combining region 20 via interconnection region 18. Which input waveguide of combining region 20 a particular output waveguide of branching region 16 connects to is determined by interchanging the first and second halves of the output waveguide's index, as shown in the following table:

| output waveguide | connects to input waveguide |
| --- | --- |
| 0000 | 0000 |
| 0001 | 0100 |
| 0010 | 1000 |
| 0011 | 1100 |
| 0100 | 0001 |
| 0101 | 0101 |
| 0110 | 1001 |
| 0111 | 1101 |
| 1000 | 0010 |
| 1001 | 0110 |
| 1010 | 1010 |
| 1011 | 1110 |
| 1100 | 0011 |
| 1101 | 0111 |
| 1110 | 1011 |
| 1111 | 1111 |

For clarity, these connections are not shown explicitly in FIG. 2.

FIG. 7 is a schematic diagram of a 1×2 splitter 26 implemented as a directional coupler. An input waveguide 36 leads into a coupling waveguide 38, which in turn leads into an output waveguide 42. Coupling waveguide 38 is close and parallel to another coupling waveguide 40, which leads into another output waveguide 44. Coupling waveguides 38 and 40 both are of length L. Coupling waveguides 38 and 40 are covered by respective electrodes 46 and 48.

Coupling waveguides 38 and 40 are sufficiently close that the evanescent field of light propagating in coupling waveguide 38 overlaps with and is coupled into coupling waveguide 40. The strength of the coupling is characterized by a coupling coefficient κ, such that in a distance $l=\pi/(2\kappa)$, all of the optical energy entering waveguide 38 is transferred by this coupling to waveguide 40. The distance l is called the transfer length. The ratio of l to L is defined herein as the "normalized coupling length" of 1×2 splitter 26.

In one type of 1×2 directional coupler splitter 26, L is chosen to be equal to l, so that the normalized coupling length of this type of 1×2 splitter 26 is equal to 1. With no voltage applied to electrodes 46 and 48, this type of 1×2 directional coupler splitter 26 is in a "crossover" state, as described above, in which all of the optical energy entering directional coupler splitter 26 in input waveguide 36 is transferred to output waveguide 44 via coupling waveguide 40. To switch this type of directional coupler splitter 26 into a "straight-through" state, in which all of the optical energy entering directional coupler splitter 26 in input waveguide 36 leaves directional coupler splitter 26 via output waveguide 42, opposite voltages are applied to electrodes 46 and 48 to alter the refractive indices of coupling waveguides 38 and 40 sufficiently in opposite directions, thereby altering the coupling coefficient κ, so that the transfer length l of directional coupler splitter 26 becomes L/2, and all of the optical energy, that is transferred from coupling waveguide 38 to coupling waveguide 40 after propagating for a distance L/2, is transferred back to coupling waveguide 38 after propagating a distance L.

In another type of 1×2 directional coupler splitter 26, the normalized coupling length is equal to ½. With no voltages applied to electrodes 46 and 48, this type of 1×2 directional coupler splitter 26 is in an "all-pass" state: only half of the optical energy entering this type of 1×2 directional coupler splitter 26 via input waveguide 36 is transferred to output waveguide 44, and the remaining optical energy leaves this type of 1×2 directional coupler splitter 26 via output waveguide 42. This type of 1×2 directional coupler splitter 26 is placed in either the crossover state or the straight-through state by the application of appropriate voltages to electrodes 46 and 48.

FIG. 8 is a schematic diagram of a 1×2 splitter 26 implemented as a Mach-Zehnder interferometer. Input waveguide 36 is coupled, by a splitting mechanism 52, to an upper branch waveguide 54 and a lower branch waveguide 56. Splitting mechanism 52 may be a y-branch coupler, as drawn, or may be an active 1×2 splitter such as a directional coupler splitter. Upper branch waveguide 54 leads into a coupling waveguide 38', which in turn leads into output waveguide 42. Lower branch waveguide 56 leads into another coupling waveguide 40' that is close and parallel to coupling waveguide 38' and that leads into output waveguide 44. Coupling waveguides 38' and 40' both are of length L. Upper and lower branch waveguides 54 and 56 are partially covered by respective electrodes 58 and 60.

Like coupling waveguides 38 and 40 of FIG. 7, coupling waveguides 38' and 40' of FIG. 8 are sufficiently close that the evanescent field of light propagating in coupling waveguide 38' overlaps with and is coupled into coupling waveguide 40'. Here, too, the strength of the coupling is characterized by a coupling coefficient κ, such that in one transfer length $l=\pi/(2\kappa)$, all of the optical energy entering waveguide 38 is transferred by this coupling to waveguide 40.

As in the case of directional coupler splitter 26, a Mach-Zehnder splitter 26 may have a normalized coupling length of 1 or a normalized coupling length of ½. In the case of a Mach-Zehnder splitter 26 with a normalized coupling length of 1, with no current flowing through electrodes 58 and 60, all of the optical energy, that enters via input waveguide 36, exits via output waveguide 44. To cause the input optical energy to exit via output waveguide 42, sufficient current is applied to one of electrodes 58 or 60 to heat the respective branch waveguide 54 or 56 so that the resulting change in the refractive index of the respective waveguide 54 or 56 is sufficient to change the relative phases of the light in coupling waveguides 38' and 40' so that all the optical energy that enters via input waveguide 36 now exits via output waveguide 42 instead of output waveguide 44.

In the case of a Mach-Zehnder splitter 26 with a normalized coupling length of ½, with no current flowing in electrodes 58 and 60, half the optical energy entering this Mach-Zehnder splitter 26 via input waveguide 36 leaves this Mach-Zehnder splitter 26 via output waveguide 42, and the other half of the optical energy leaves this Mach-Zehnder splitter 26 via output waveguide 44. Application of the appropriate current to one of the electrodes 58 or 60 causes all the input optical energy to leave this Mach-Zehnder splitter via output waveguide 42, and application of the appropriate current to the other electrode 58 or 60 causes all the input optical energy to leave this Mach-Zehnder splitter via output waveguide 44.

Although in principle Mach-Zehnder splitter 26 need be fabricated with only one electrode, either electrode 58 or 60, to enable this switching, in practice both electrodes are fabricated because the fabrication process alters the properties of branching waveguides 54 and 56, and fabricating both electrodes 58 and 60, by inducing identical changes in the properties of branching waveguides 54 and 56, preserves the symmetry of Mach-Zehnder splitter 26.

Because of the symmetry of Mach-Zehnder splitter 26, it is arbitrary which of the two output states is designated as a crossover state and which is designated as a straight-through state. For consistency with the description of directional coupler splitter 26, the state in which all input optical energy emerges from Mach-Zehnder splitter 26 via output waveguide 42 is considered herein to be the straight-through state, and the state in which all input optical energy emerges from Mach-Zehnder splitter 26 via output waveguide 44 is considered herein to be the crossover state.

Note that the all-pass states of both directional coupler splitter 26 and Mach-Zehnder splitter 26, that have normalized coupling lengths of ½, are passive states. Directional coupler splitter 26 that has a normalized coupling length of ½ is in its all-pass state when no voltages are applied to electrodes 46 and 48. Mach-Zehnder splitter 26 that has a normalized coupling length of ½ is in its all-pass state when no current flows in electrodes 58 and 60.

By exchanging the roles of the input and output waveguides, 1×2 splitters 26 illustrated in FIGS. 7 and 8 are transformed into 2×1 combiners 28. In the straight-through state of such a 2×1 combiner 28, all of the optical energy input via input waveguide 42, and none of the optical energy input via input waveguide 44, emerges via output waveguide 36; and in the crossover state of such a 2×1 combiner 28, all of the optical energy input via input waveguide 44, and none of the optical energy input via input waveguide 42, emerges via output waveguide 36. In the all-pass state of such a 2×1 combiner, half of the energy of the optical signals entering via input waveguides 42 or 44 is superposed in output waveguide 36, with the other half of the energy being lost to scattering.

The numbers of input waveguides 12 and output waveguides 14 need not be powers of two, and need not be equal. FIG. 3 shows a classical 4×3 tree network architecture, for connecting four input waveguides 12 to three output waveguides 16. The waveguides of FIG. 3 are indexed as in FIG. 2. As in FIG. 2, the output waveguides of branching cascades 30 emerge from branching cascades 30 in least significant inserted bit order relative to the input waveguides of branching cascades 30, and the input waveguides of combining cascades 32 enter combining cascades 32 in least significant inserted bit order relative to the output waveguides of combining cascades 32. The following table shows how the output waveguides of branching region 16 are connected to the input waveguides of combining region 20 in interconnection region 18:

| output waveguide | connects to input waveguide |
| --- | --- |
| 0000 | 0000 |
| 0001 | 0100 |
| 0010 | 1000 |
| 0100 | 0001 |
| 0101 | 0101 |
| 0110 | 1001 |
| 1000 | 0010 |
| 1001 | 0110 |
| 1010 | 1010 |
| 1100 | 0011 |
| 1101 | 0111 |
| 1110 | 1011 |

Note that the optical switch networks of FIGS. 1–3 are reversible. Output waveguides 14 can be used as input waveguides, and input waveguides 12 can be used as output waveguides, with combiners 28 used as splitters and splitters 26 used as combiners. For example, the tree network architecture illustrated in FIG. 3 is also the architecture of a classical 3×4 tree network.

For the output waveguides of branching region 16 to connect to the input waveguides of combining region 20, these waveguides must cross each other extensively. Waveguides that cross each other must do so at a sufficiently large angle to preclude crosstalk. If the number of input waveguides 12 and output waveguides 14 is large, it is difficult to achieve this without making interconnection region 18 unreasonably large.

There is thus a widely recognized need for, and it would be highly advantageous to have, a tree network architecture with lower crosstalk and better space utilization than known tree network architectures.

SUMMARY OF THE INVENTION

According to the present invention there is provided an optical switch network including: (a) $N=2^j$ switch input waveguides, where j is an integer greater than 1; (b) N switch output waveguides; (c) a branching subnetwork including a plurality of successive branching cascades, each branching cascade including a plurality of 1×2 splitters, each 1×2 splitter of each branching cascade connecting a branching cascade input waveguide of each branching cascade to two branching cascade output waveguides of each branching cascade, the switch input waveguides serving as the branching cascade input waveguides of a first of the branching cascades, the branching cascade output waveguides of each branching cascade other than a last branching cascade serving as the branching cascade input waveguides of a successor branching cascade to each branching cascade other than the last branching cascade, at least some of the branching cascade output waveguides of each branching cascade crossing each other so that the branching cascade output waveguides of each branching cascade emerge from each branching cascade in a k-th inserted bit order relative to the branching cascade input waveguides of each branching cascade, where k is an integer greater than j; and (d) a combining subnetwork of 2×1 combiners for connecting the branching cascade output waveguides of the last branching cascade to the N switch output waveguides, the branching cascade output waveguides of the last branching cascade being connected directly to respective 2×1 combiners.

According to the present invention there is provided an optical switch network including: (a) $N=2^j$ switch input waveguides, where j is an integer greater than 1; (b) N switch output waveguides; (c) a branching subnetwork of 1×2 splitters; and (d) a combining subnetwork connected to the switch input waveguides via the branching subnetwork, the combining subnetwork including a plurality of successive combining cascades, each combining cascade including a plurality of 2×1 combiners, each 2×1 combiner of each combining cascade connecting two combining cascade input waveguides of each combining cascade to a combining cascade output waveguide of each combining cascade, the combining cascade input waveguides of a first combining cascade being connected directly to respective 1×2 splitters of the branching subnetwork, the combining cascade input waveguides of each combining cascade other than the first combining cascade serving as the combining cascade output waveguides of a predecessor combining cascade to each combining cascade other than the first combining cascade, the switch output waveguides serving as the combining cascade output waveguides of a last of the combining cascades, at least some of the combining cascade input waveguides of each combining cascade crossing each other so that the combining cascade input waveguides of each combining cascade enter each combining cascade in a k-th inserted bit order relative to the combining cascade output waveguides of each combining cascade, where k is an integer greater than j.

According to the present invention there is provided an optical switch network including: (a) P switch input waveguides, P being an integer greater than 2; (b) Q switch output waveguides, Q being an integer greater than 2; (c) a branching subnetwork including a plurality of successive branching cascades, each branching cascade including a plurality of 1×2 splitters, each 1×2 splitter of each branching cascade connecting a branching cascade input waveguide of each branching cascade to two branching cascade output waveguides of each branching cascade, the switch input waveguides serving as the branching cascade input waveguides of a first of the branching cascades, the branching cascade output waveguides of each branching cascade other than a last branching cascade serving as the branching cascade input waveguides of a successor branching cascade to each branching cascade other than the last branching cascade, at least some of the branching cascade output waveguides of each branching cascade crossing each other so that the branching cascade output waveguides of each branching cascade emerge from each branching cascade in a k-th inserted bit order relative to the branching cascade input waveguides of each branching cascade, where k is an integer greater than a smallest integer j such that $2^j$ is at least as great as a larger of P and Q; and (d) a combining subnetwork of 2×1 combiners for connecting the branching cascade output waveguides of the last branching cascade to the Q switch output waveguides, the branching cascade output waveguides of the last branching cascade being connected directly to respective 2×1 combiners.

According to the present invention there is provided an optical switch network including: (a) P switch input waveguides, P being an integer greater than 2; (b) Q switch output waveguides, Q being an integer greater than 2; (c) a branching subnetwork of 1×2 splitters; and (d) a combining subnetwork connected to the switch input waveguides via the branching subnetwork, the combining subnetwork including a plurality of successive combining cascades, each combining cascade including a plurality of 2×1 combiners, each 2×1 combiner of each combining cascade connecting two combining cascade input waveguides of each combining cascade to a combining cascade output waveguide of each combining cascade, the combining cascade input waveguides of a first combining cascade being connected directly to respective 2×1 splitters of the branching subnetwork, the combining cascade input waveguides of each combining cascade other than the first combining cascade serving as the combining cascade output waveguides of a predecessor combining cascade to each combining cascade other than the first combining cascade, the switch output waveguides serving as the combining cascade output waveguides of a last of the combining cascades, at least some of the combining cascade input waveguides of each combining cascade crossing each other so that the combining cascade input waveguides of each combining cascade enter each combining cascade in a k-th inserted bit order relative to the combining cascade output waveguides of each combining cascade, where k is an integer greater than a smallest integer j such that $2^j$ is at least as great as a larger of P and Q.

According to the present invention there is provided an optical switch network including: (a) $N=2^j$ switch input waveguides, where j is an integer greater than 1; (b) N switch output waveguides; (c) a branching subnetwork including a plurality of successive branching cascades, each branching cascade including a plurality of 1×2 splitters, each 1×2 splitter of each branching cascade connecting a branching cascade input waveguide of each branching cascade to two branching cascade output waveguides of each branching cascade, the switch input waveguides serving as the branching cascade input waveguides of a first of the branching cascades, the branching cascade output waveguides of each branching cascade other than a last branching cascade serving as the branching cascade input waveguides of a successor the branching cascade to each branching cascade other than the last branching cascade, at least some of the branching cascade output waveguides of each branching cascade crossing each other so that the branching cascade output waveguides of each branching cascade that are connected to a common switch input waveguide emerge from each branching cascade at least N branching cascade output waveguides of each branching cascade apart; and (d) a combining subnetwork of 2×1 combiners for connecting the branching cascade output waveguides of the last branching cascade to the N switch output waveguides, the branching cascade output waveguides of the last branching cascade being connected directly to respective 2×1 combiners.

According to the present invention there is provided an optical switch network including: (a) N=2$^j$ switch input waveguides, where j is an integer greater than 1; (b) N switch output waveguides; (c) a branching subnetwork of 1×2 splitters; and (d) a combining subnetwork connected to the switch input waveguides via the branching subnetwork, the combining subnetwork including a plurality of successive combining cascades, each combining cascade including a plurality of 2×1 combiners, each 2×1 combiner of each combining cascade connecting two combining cascade input waveguides of each combining cascade to a combining cascade output waveguide of each combining cascade, the combining cascade input waveguides of a first combining cascade being connected directly to respective 1×2 splitters of the branching subnetwork, the combining cascade input waveguides of each combining cascade other than the first combining cascade serving as the combining cascade output waveguides of a predecessor combining cascade to each combining cascade other than the first combining cascade, the switch output waveguides serving as the combining cascade output waveguides of a last of the combining cascades, at least some of the combining cascade input waveguides of each combining cascade crossing each other so that the combining cascade input waveguides of each combining cascade that are connected to a common switch output waveguide enter each combining cascade at least N combining cascade output waveguides of each combining cascade apart.

According to the present invention there is provided an optical switch network including: (a) P switch input waveguides, P being an integer greater than 2; (b) Q switch output waveguides, Q being an integer greater than 2; (c) a branching subnetwork including a plurality of successive branching cascades, each branching cascade including a plurality of 1×2 splitters, each 1×2 splitter of each branching cascade connecting a branching cascade input waveguide of each branching cascade to two branching cascade output waveguides of each branching cascade, the switch input waveguides serving as the branching cascade input waveguides of a first of the branching cascades, the branching cascade output waveguides of each branching cascade other than a last branching cascade serving as the branching cascade input waveguides of a successor branching cascade to each branching cascade other than the last branching cascade, at least some of the branching cascade output waveguides of each branching cascade crossing each other so that the branching cascade output waveguides of each branching cascade that are connected to a common switch input waveguide emerge from each branching cascade at least P branching cascade output waveguides of each branching cascade apart; and (d) a combining subnetwork of 2×1 combiners for connecting the branching cascade output waveguides of the last branching cascade to the Q switch output waveguides, the branching cascade output waveguides of the last branching cascade being connected directly to respective 2×1 combiners.

According to the present invention there is provided an optical switch network including: (a) P switch input waveguides, P being an integer greater than 2; (b) Q switch output waveguides, Q being an integer greater than 2; (c) a branching subnetwork of 1×2 splitters; and (d) a combining subnetwork connected to the switch input waveguides via the branching subnetwork, the combining subnetwork including a plurality of successive combining cascades, each combining cascade including a plurality of 2×1 combiners, each 2×1 combiner of each combining cascade connecting two combining cascade input waveguides of each combining cascade to a combining cascade output waveguide of each combining cascade, the combining cascade input waveguides of a first combining cascade being connected directly to respective 1×2 splitters of the branching subnetwork, the combining cascade input waveguides of each combining cascade other than a first combining cascade serving as the combining cascade output waveguides of a predecessor combining cascade to each combining cascade other than the first combining cascade, the switch output waveguides serving as aid combining cascade output waveguides of a last of the combining cascades, at least some of the combining cascade input waveguides of each combining cascade crossing each other so that the combining cascade input waveguides of each combining cascade that are connected to a common switch output waveguide enter each combining cascade at least Q combining cascade input waveguides of each combining cascade apart.

According to the present invention there is provided an optical switch network including: (a) at least 4 input waveguides; (b) at least 4 output waveguides; (c) a plurality of 1×2 splitters for receiving optical signals from the input waveguides; and (d) a plurality of 2×1 combiners for receiving the signals from the 1×2 splitters and directing the signals to the output waveguides; wherein at least one component, selected from the group consisting of the 1×2 splitters and the 2×1 combiners, has a normalized coupling length equal to about an odd multiple of ½.

According to the present invention there is provided an optical switch network including: (a) at least 4 network input waveguides; (b) at least 4 network output waveguides; (c) a plurality of 1×2 splitters, each 1×2 splitter for receiving optical signals from at least one of the network input waveguides and directing the signals into at least one of two respective splitter output waveguides, at least one of the 1×2 splitters having: (i) a passive state wherein the signals received by the at least one 1×2 splitter emerge therefrom via both the respective splitter output waveguides, (ii) a first active state wherein the signals received by the at least one 1×2 splitter emerge therefrom only via a first of the respective splitter output waveguides, and (iii) a second active state wherein the signals received by the at least one 1×2 splitter emerge therefrom only via a second of the respective splitter output waveguides; and (d) a plurality of 2×1 combiners, each 2×1 combiner receiving the signals from the 1×2 splitters via at least one of two respective combiner input waveguides and directing the signals to at least one of the network output waveguides, at least one of the 2×1 combiners having: (i) a passive state wherein the signals received by the at least one 2×1 combiner via both the respective combiner input waveguides are superposed in the at least one 2×1 combiner, (ii) a first active state wherein at least a portion of only the signals received by the at least one 2×1 combiner via a first of the respective combiner input waveguides emerge from the at least one 2×1 combiner, and (iii) a second active state wherein at least a portion of only the signals received by the at least one 2×1 combiner via a second of the respective combiner input waveguides emerge from the at least one ×1 combiner.

According to the present invention there is provided an optical switch network including: (a) P input waveguides, wherein P is an integer at least as great as four; (b) Q output waveguides, wherein Q is an integer at least as great as four; and (c) a plurality of optical switches connecting the input waveguides to the output waveguides, each switch having an extinction ratio substantially equal to a fraction $\Delta$, the optical switch network having a worst case crosstalk of at most about $\Delta^2(2-2/L)$, where L is a smaller of P and Q.

According to the present invention there is provided an optical switch network including: (a) N input waveguides, where N is an integer at least as great as 16; (b) N output waveguides; and (c) a plurality of optical switches connecting the N input waveguides to the N output waveguides according to a CLOS architecture including: (i) a first stage including r n×m subnetworks of the switches, (ii) a second stage including m r×r subnetworks of the switches, and (iii) a third stage including r m×n subnetworks of the switches, wherein n and r are integers such that N is a product of n and r and m is an integer at least as great as 2n−1, each switch having an extinction ratio substantially equal to a fraction $\Delta$, the optical switch network having a worst case crosstalk of at most about $\Delta^2(6-2/r-4/n)$.

The tree network architecture of the present invention achieves its objective of efficient space utilization by concentrating the waveguide crossings in branching region 16, as described in detail below. Other tree network architectures are known that distribute the waveguide crossings among branching region 16, interconnection region 18 and combining region 20. See, for example, Spanke, U.S. Pat. No. 4,787,692 and Okuyama et al., U.S. Pat. No. 4,852,958. Unlike the present invention, none of these prior art tree network architectures concentrate the waveguide crossings exclusively in branching region 16.

Another aspect of the tree network architecture of the present invention that distinguishes the present invention from the prior art tree networks is that in a tree network of the present invention, the output waveguides of branching region 16 connect directly to the input waveguides of combining region 20. Indeed, the output waveguides of branching region 16 serve as the input waveguides of combining region 20 and connect 1×2 splitters 26 of the last branching cascade 30 of branching region 16 directly to 2×1 combiners 28 of the first combining cascade 32 of combining region 20. Tomoaki Kato et al., in "Hybrid integrated 4×4 optical matrix switch module on silica based planar waveguide platform", *IEEE Trans. Electron.*, vol. E82-C no. 2 pp. 305–311 (February 1999)) describe an optical switch network that resembles a 4×4 optical switch network of the present invention, but with components such as semiconductor optical amplifiers intervening between the output waveguides of branching region 16 and the input waveguides of combining region 20.

As in the case of the classical tree network architecture, the tree network architecture of the present invention is reversible.

To achieve the objective of low crosstalk, the scope of the present invention also includes optical switch networks generally, whether having an architecture of the present invention or a prior art architecture, that are based on 1×2 splitters and 2×1 combiners that have passive all-pass states. Preferred examples of such splitters and combiners include optical switches, such as directional couplers and Mach-Zehnder interferometers, that have a normalized coupling length equal to an odd multiple of ½. Preferably, the multiple of ½ is ½ itself. As described below, such optical switch networks are more compact and have lower electrical power consumption and lower worst case crosstalk than prior art optical switch networks of comparable architectures.

Two such optical networks are of particular interest. An optical switch network, based on a tree architecture connecting P≧4 input waveguides to Q≧4 output waveguides, whose splitters and combiners have an extinction ratio of $\Delta$, has a worst case crosstalk of at most $\Delta^2(2-2/L)$, where L is the lesser of P and Q. An optical switch network, based on a CLOS architecture connecting N≧16 input waveguides to N output waveguides via three stages of subnetworks, the first stage including r n×m subnetworks, where nr=N and m≧2n−1, the second stage including m r×r subnetworks, and the third stage including r m×n subnetworks, has a worst case crosstalk of at most $\Delta^2(\log_2 n + \log_2 m + \log_2 r)$.

The scope of the present invention also includes methods of switching optical energy that rely on such splitters and combiners.

BRIEF DESCRIPTION OF THE DRAWINGS

The invention is herein described, by way of example only, with reference to the accompanying drawings, wherein.

DESCRIPTION OF THE PREFERRED
EMBODIMENTS

The present invention is of an optical switch network which is more compact and has less crosstalk than comparable known optical switch networks.

The principles and operation of an optical switch network according to the present invention may be better understood with reference to the drawings and the accompanying description.

Figure 1:
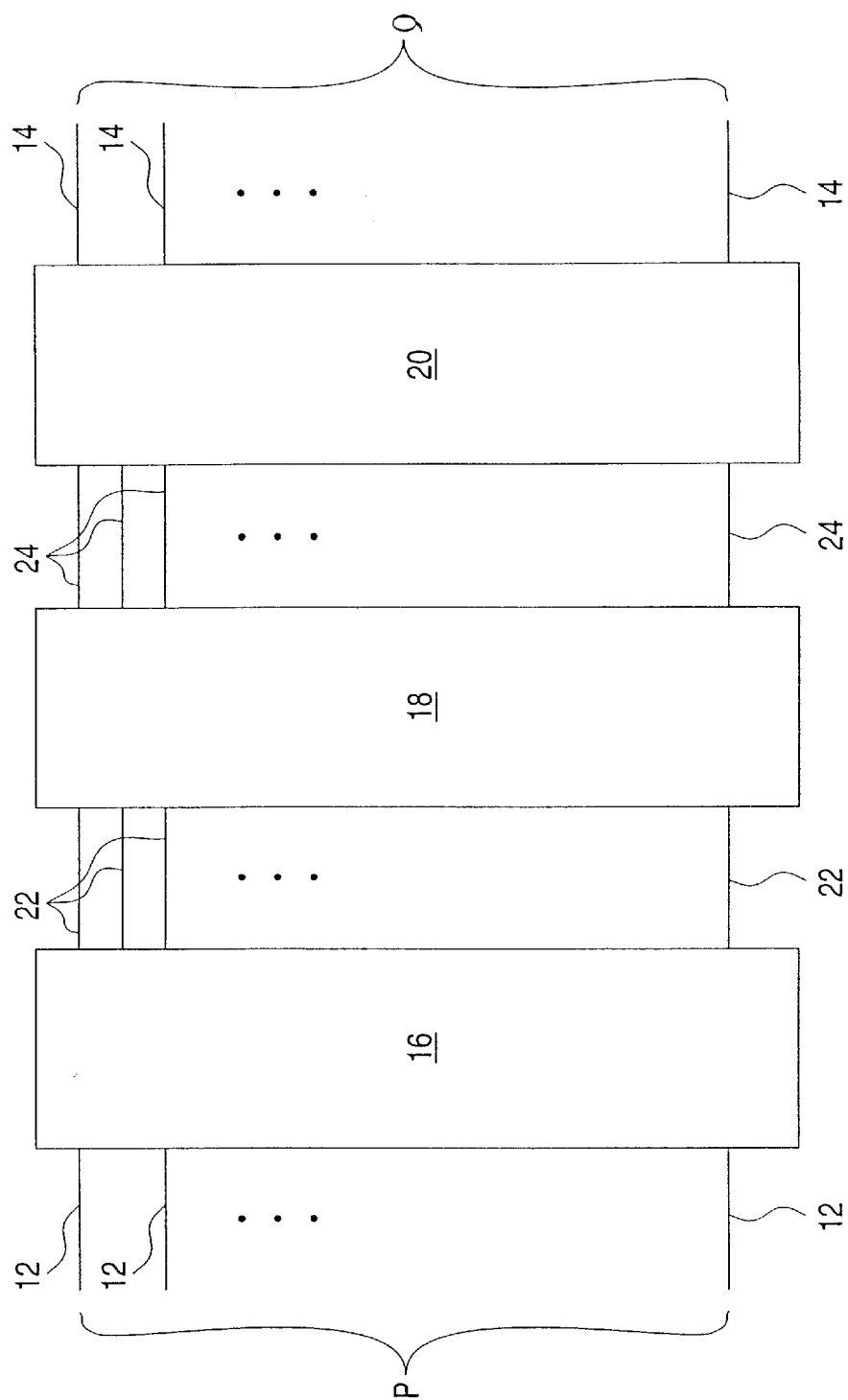
FIG. 1 is a high level diagram of a generic tree network.
Figure 2:
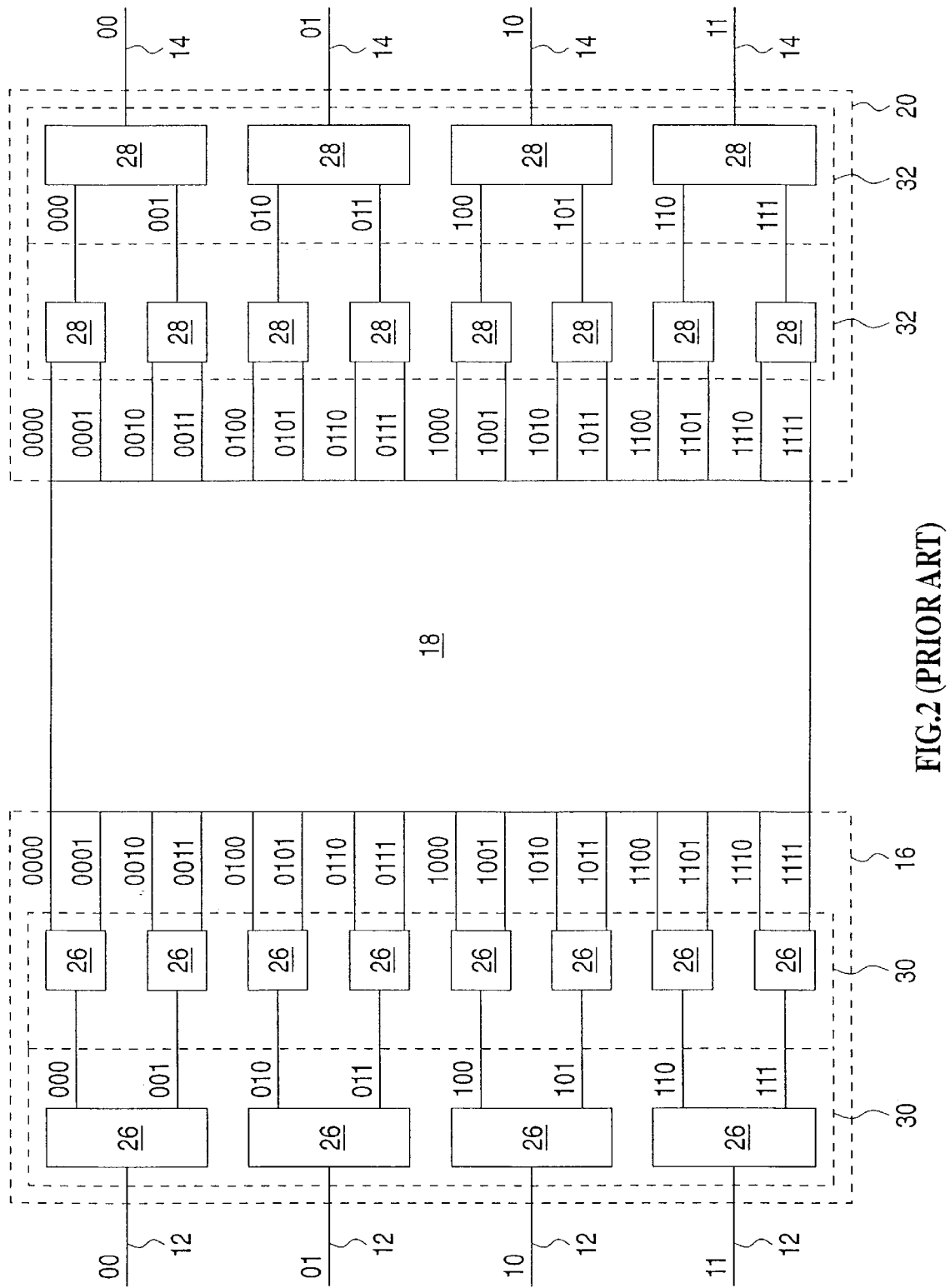
FIG. 2 shows the architecture of a classical 4×4 tree network.
Figure 3:
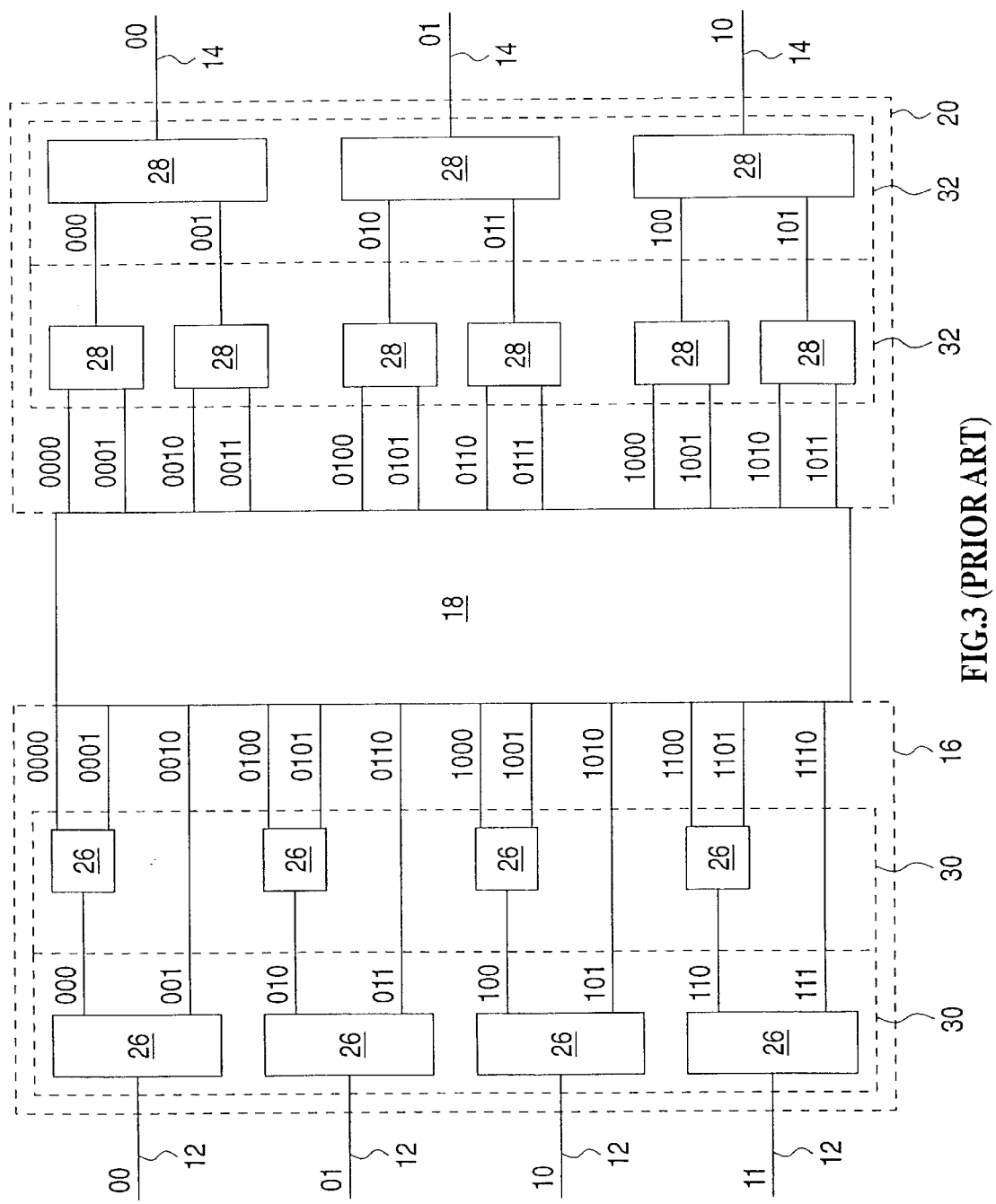
FIG. 3 shows the architecture of a classical 4×3 tree network.
Figure 4:
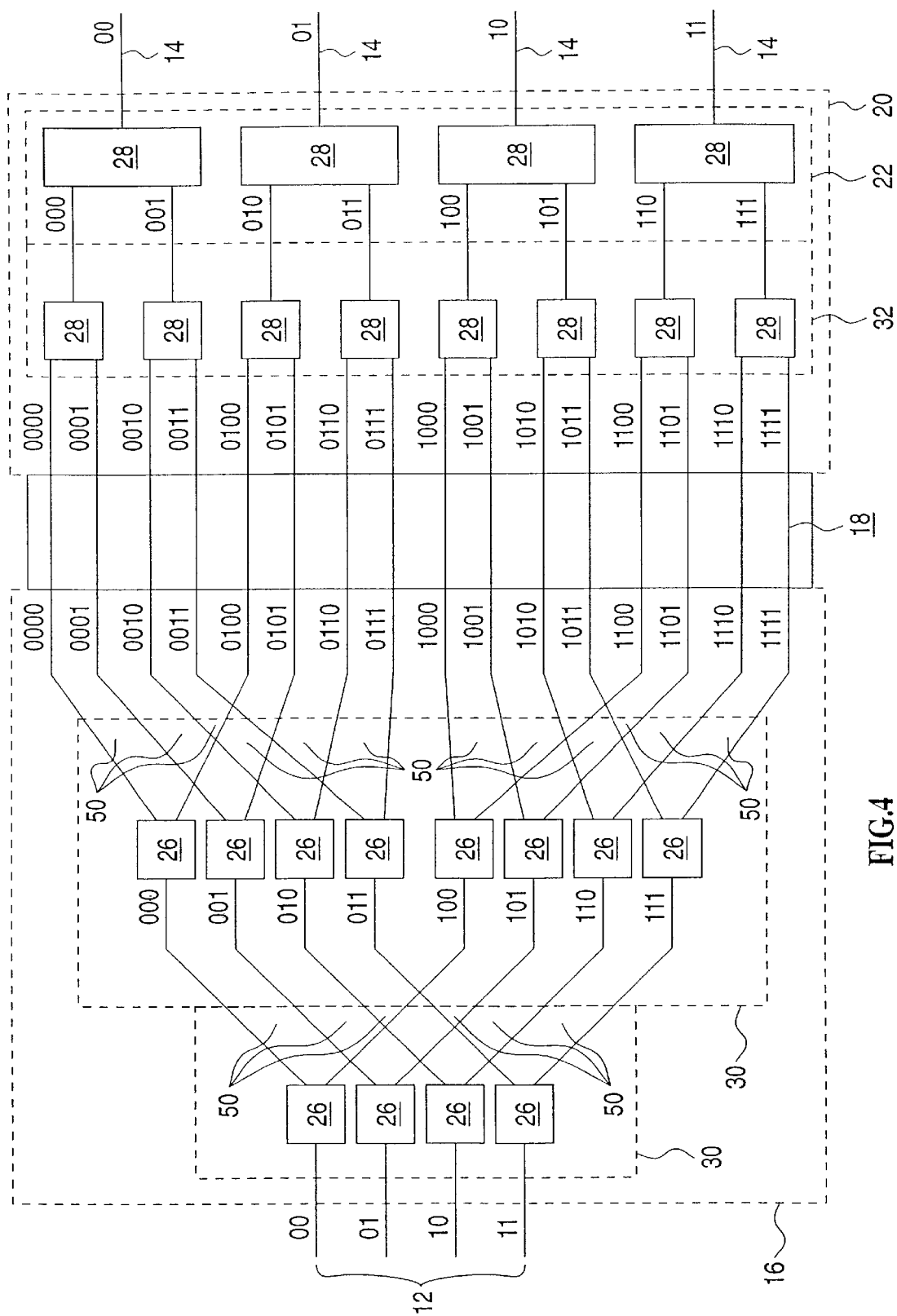
FIG. 4 shows the architecture of a 4×4 tree network of the present invention.

Referring again to the drawings, FIG. 4 illustrates the architecture of a 4×4 network of the present invention, for connecting four input waveguides 12 to four output waveguides 14. As in the classical architecture of FIG. 2, input waveguides 12 and output waveguides 14 are indexed serially with binary numbers, from 00 to 11. The key difference between the architecture of FIG. 4 and the classical architecture of FIG. 2 is in the way the output waveguides of branching cascades 30 emerge from branching cascades 30. Specifically, the output waveguides of either branching cascade 30 emerge from that branching cascade 30 in what is termed herein "third inserted bit order". The indices of the upper output waveguide emerging from any one of 1×2 splitters 26 is obtained by interpolating a zero between the second and third bits of the index of the input waveguide if the index of the input waveguide has three bits, and by appending a zero to the left end of the index of the input waveguide if the index of the input waveguide has two bits. The indices of the lower output waveguide emerging from any one of 1×2 splitters 26 is obtained by interpolating a one between the second and third bits of the index of the input waveguide if the index of the input waveguide has three bits, and by appending a one to the left end of the index of the input waveguide if the index of the input waveguide has two bits. As a result, each output waveguide of branching region 16 emerges from branching region 16 opposite the input waveguide of combining region 20 to which that output waveguide of branching region 16 must connect. The output waveguides of branching region 16 connect directly to the corresponding input waveguides of combining region 20, and there are no waveguide crossings in interconnection region 18.

More generally, the construction of the architecture of a $2^j \times 2^j$ network of the present invention, for connecting $2^j$ input waveguides 12 to $2^j$ output waveguides 14, starts by indexing the $2^j$ input waveguides and the $2^j$ output waveguides with binary numbers from 0 to $2^j-1$. For example, for j=3 (eight input waveguides 12 and eight output waveguides 14), the indices are 000 through 111, and for j=4 (sixteen input waveguides 12 and sixteen input waveguides 14), the indices are 0000 through 1111. Branching region 16 of a $2^j \times 2^j$ network of the present invention includes j branching cascades 30. The output waveguides of one of these branching cascades 30 emerge from that branching cascade 30 in j+1-th inserted bit order. The indices of input waveguides 12, which are the input waveguides of 1×2 splitters 26 of the first branching cascade 30, have j bits. The index of the upper output waveguide emerging from a 1×2 splitter 26 of the first branching cascade 30 is obtained by appending a zero to the left end of the index of the input waveguide of that 1×2 splitter 26. The index of the lower output waveguide emerging from a 1×2 splitter 26 of the first branching cascade 30 is obtained by appending a one to the left end of the index of the input waveguide of that 1×2 splitter 26. The indices of the input waveguides of 1×2 splitters 26 of subsequent branching cascades 30 have more than j bits. The index of the upper output waveguide emerging from a 1×2 splitter 26 of a subsequent branching cascade 30 is obtained by interpolating a zero between the j-th and j+1-th bit of the index of the input waveguide of that 1×2 splitter 26. The index of the lower output waveguide emerging from a 1×2 splitter 26 of a subsequent branching cascade 30 is obtained by interpolating a one between the j-th and j+1-th bit of the index of the input waveguide of that 1×2 splitter 26.

More generally still, the output waveguides of a branching cascade 30 of a 2j×2j network of the present invention emerge from that branching cascade 30 in k-th inserted bit order, where k is an integer that is greater than j but no greater than the number of bits in the indices of those output waveguides. To minimize the number of waveguide crossings, the preferred value of k is j+1.

The 4×4 network illustrated in FIG. 4 also includes dummy waveguides 50 that cross selected output waveguides of branching cascades 30. As taught by Okuyama et al. in U.S. Pat. No. 4,852,958, dummy waveguides 50 equalize the number of other waveguides crossed by each output waveguide of branching cascades 30, so that the 4×4 network of FIG. 4 has nearly uniform output optical intensity.

Figure 5:
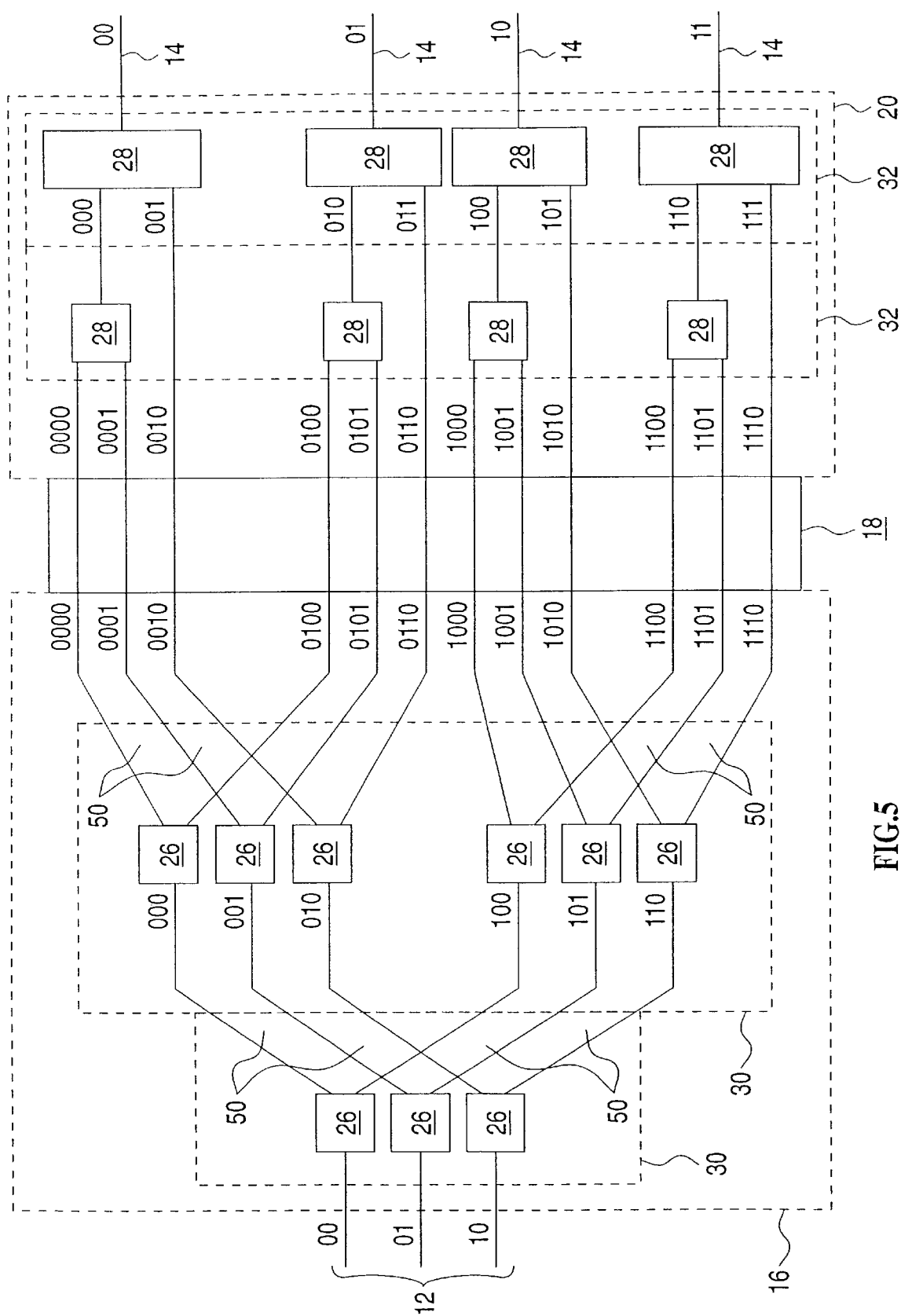
FIG. 5 shows the architecture of a 3×4 tree network of the present invention.

As in the case of the classical tree network architecture, the tree network architecture of the present invention applies to numbers of input waveguides 12 and output waveguides 14 that are not powers of two. FIG. 5 illustrates the architecture of a 3×4 network of the present invention, for connecting three input waveguides 12 to four output waveguides 14. As in the tree network architecture of FIG. 4, the output waveguides of the two branching cascades 30 of the tree network architecture of FIG. 5 emerge from their respective branching cascades 30 in third inserted bit order. In general, a tree network architecture of the present invention, for connecting P input waveguides to Q output waveguides, is derived by constructing a tree network architecture of the present invention for connecting $2^j$ input waveguides to $2^j$ output waveguides, where j is the smallest integer such that $2^j$ is greater than or equal to the larger of P and Q, and then deleting the unnecessary waveguides, splitters and combiners. The network has j branching cascades 30, and the output waveguides of each branching cascade 30 emerge from that branching cascade 30 in k-th inserted bit order, where k is an integer that is greater than j but no greater than the number of bits in the indices of those output waveguides. As in the case of the $2^j \times 2^j$ architecture, the preferred value of k is j+1, for all branching cascades 30. It should be noted, however, that the scope of the present invention does not include the degenerate cases of P or Q being equal to 1 or 2, because in those cases the classical tree network architecture and the tree network architecture of the present invention are identical.

Alternatively, the tree network architecture of the present invention is characterized by the property of branching cascades 30 that, in a network for connecting P input waveguides 12 to Q output waveguides 14, the output waveguides of any branching cascade 30 that are connected to the same input waveguide 12 emerge from that branching cascade 30 at least P output waveguides apart. For example, in the architecture of FIG. 4, branching waveguides 000 and 100, which are connected to input waveguide 12 having index 00, emerge from the first branching cascade 30 four branching waveguides apart (branching waveguides 001, 010 and 011 intervene between branching waveguides 000 and 100); and branching waveguides 1001 and 1101, which are connected (ultimately) to input waveguide 12 having index 01, also emerge from the second branching cascade 30 four branching waveguides apart (branching waveguides 1010, 1011 and 1100 intervene between branching waveguides 1001 and 1101). Similarly, in the architecture of FIG. 5, branching waveguides 001 and 101, which are connected to input waveguide 12 having index 01, emerge from the first branching cascade 30 three branching waveguides apart (branching waveguides 010 and 100 intervene between branching waveguides 001 and 101), and branching waveguides 0010 and 0110, which are connected (ultimately) to input waveguide 12 having index 10, also emerge from the second branching cascade 30 three branching waveguides apart (branching waveguides 0100 and 0101 intervene between branching waveguides 0010 and 0110).

Like the 4×4 network of FIG. 4, the 3×4 network of FIG. 5 includes dummy waveguides 50 that cross selected output waveguides of branching cascades 30 to ensure that the 3×4 network of FIG. 5 has nearly uniform output optical intensity.

As in the case of the classical tree network architecture, the tree network architecture of the present invention is reversible. An architecture for connecting P input waveguides to Q output waveguides may be used to connect Q input waveguides to P output waveguides, by exchanging the roles of all the waveguides, and by exchanging the roles of the 1×2 splitters and the 2×1 combiners.

Figure 6:
FIG. 6 shows the layout of a 16×16 optical switch network of the present invention on a 4" diameter silicon wafer.

FIG. 6 shows the layout of a 16×16 optical switch network of the present invention, for connecting sixteen input waveguides 12 to sixteen output waveguides 14, on a face 34 of a 4" silicon wafer. Interconnect region 18, combining region 20, and the four branching cascades 30a, 30b, 30c and 30d that constitute the branching region are outlined with dashed lines. Note that interconnect region 18 and combining region 20 are radially beyond branching cascades 30a, 30b, 30c and 30d. Each splitter 26 and each combiner 28 (not shown explicitly) is 9 mm long. To minimize losses and crosstalk, the waveguides cross at angles of at least 30°, and the radii of the bends are at least 5 mm. This layout has a worst case crosstalk of better than 40 dB and an insertion loss of less than 7 dB.

Although the specific layout illustrated in FIG. 6 is intended for implementation on a 4" silicon wafer, it will be clear to those skilled in the art how to apply the principles of the present invention to the fabrication of an optical switch network on any suitable electro-optic substrate, for example, on a 4" Z-cut lithium niobate wafer.

Figure 7:
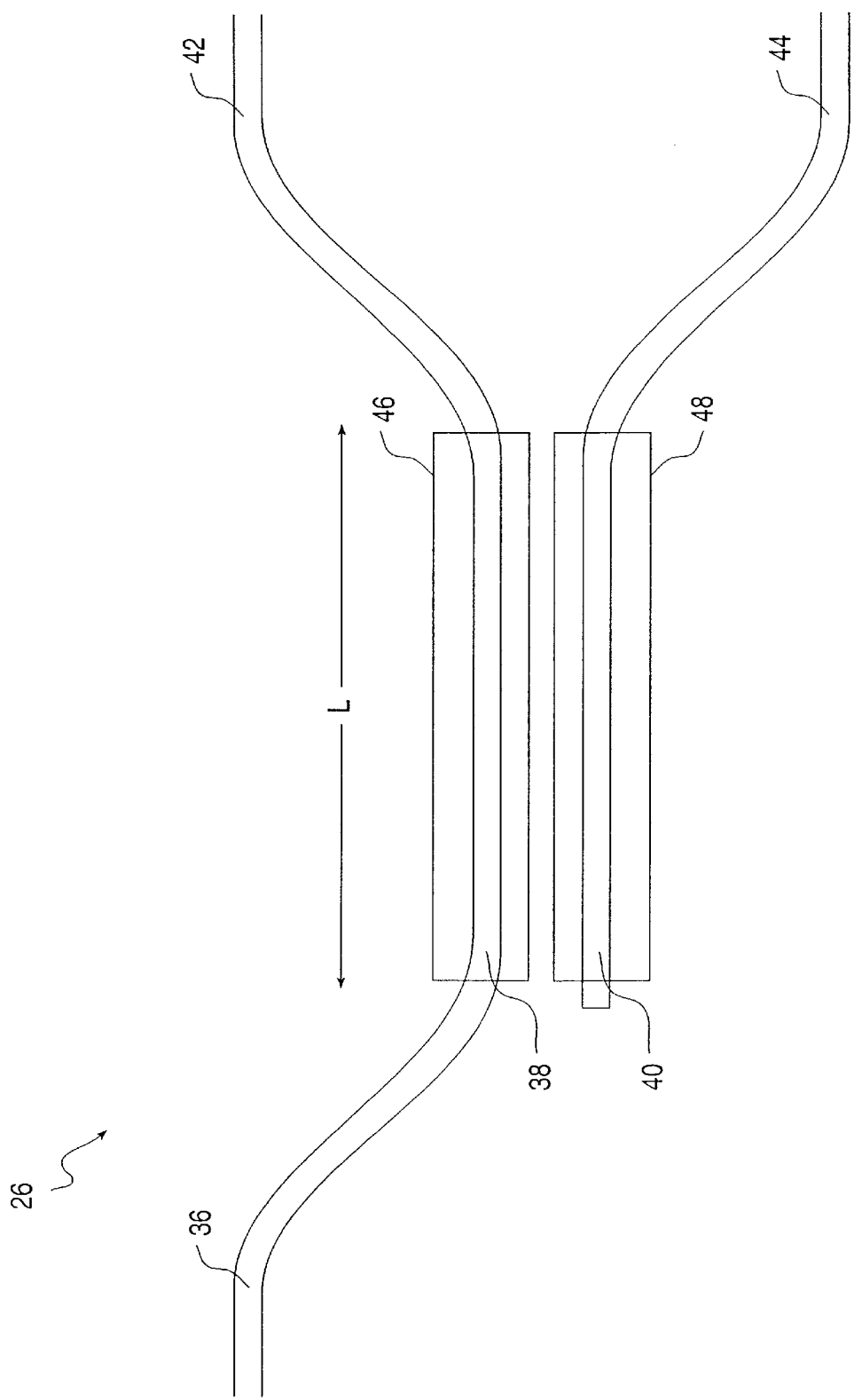
FIG. 7 is a schematic diagram of a 1×2 splitter implemented as a directional coupler.
Figure 8:
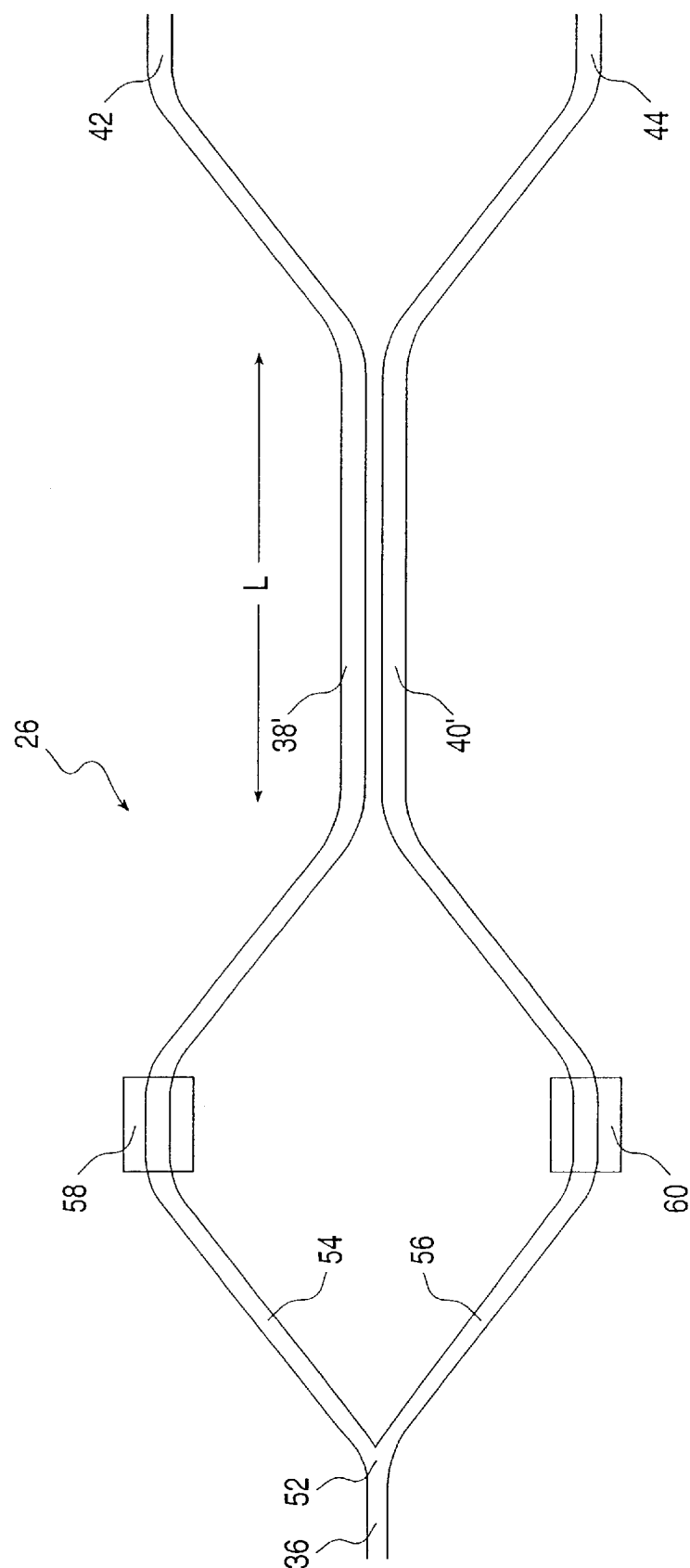
FIG. 8 is a schematic diagram of a 1×2 splitter implemented as a Mach-Zehnder interferometer.

Another aspect of the present invention is based on the discovery that an optical switch network, that is based on 1×2 splitters 26 and 2×1 combiners 28 that have passive all-pass states, has significantly lower worst-case crosstalk than comparable optical switch networks based on other types of 1×2 splitters 26 and 2×1 combiners 28. Examples of 1×2 splitters 26 and 2×1 combiners 28 that have passive all-pass states include, but are not limited to, the 1×2 splitters 26 and 2×1 combiners 28, illustrated in FIGS. 7 and 8, that have normalized coupling lengths of ½, as discussed above. Note that, more generally, the normalized coupling lengths may be odd multiples of ½, although a normalized coupling length of ½ is preferred.

Specifically, a P×Q tree network, for connecting P input waveguides to Q output waveguides, that is based on switches 26 and 28 that have passive crossover states, be the network a classical tree network, some other prior art tree network, or a tree network of the present invention, can be shown to have a worst case crosstalk of $\Delta^2 \log_2 P$ if $\log_2 P \leq Q$, and a worst case crosstalk of $\Delta^2(Q-1)$ if $\log_2 P > Q$, where $\Delta$ is the extinction ratio of one switch, i.e., (in the case of a 1×2 splitter 26) the reciprocal of the ratio of the optical power directed to the intended output waveguide to the optical power directed to the other waveguide when the switch is in a pure crossover state or in a pure straight-through state. A P×Q tree network that is based on switches 26 and 28 that have passive all-pass states can be shown to have a worst case crosstalk of $\Delta^2(2-2/L)$, where $L=\min(P,Q)$. When P and Q are both at least as great as 4, this crosstalk is significantly less than the crosstalk of a P×Q tree network based on prior art switches.

In addition, an optical switch network based on switches 26 and 28 that have passive all-pass states uses less electrical power in broadcast or multicast mode than a comparable prior art optical switch network, and is more compact than a comparable prior art optical switch network.

Figure 9:
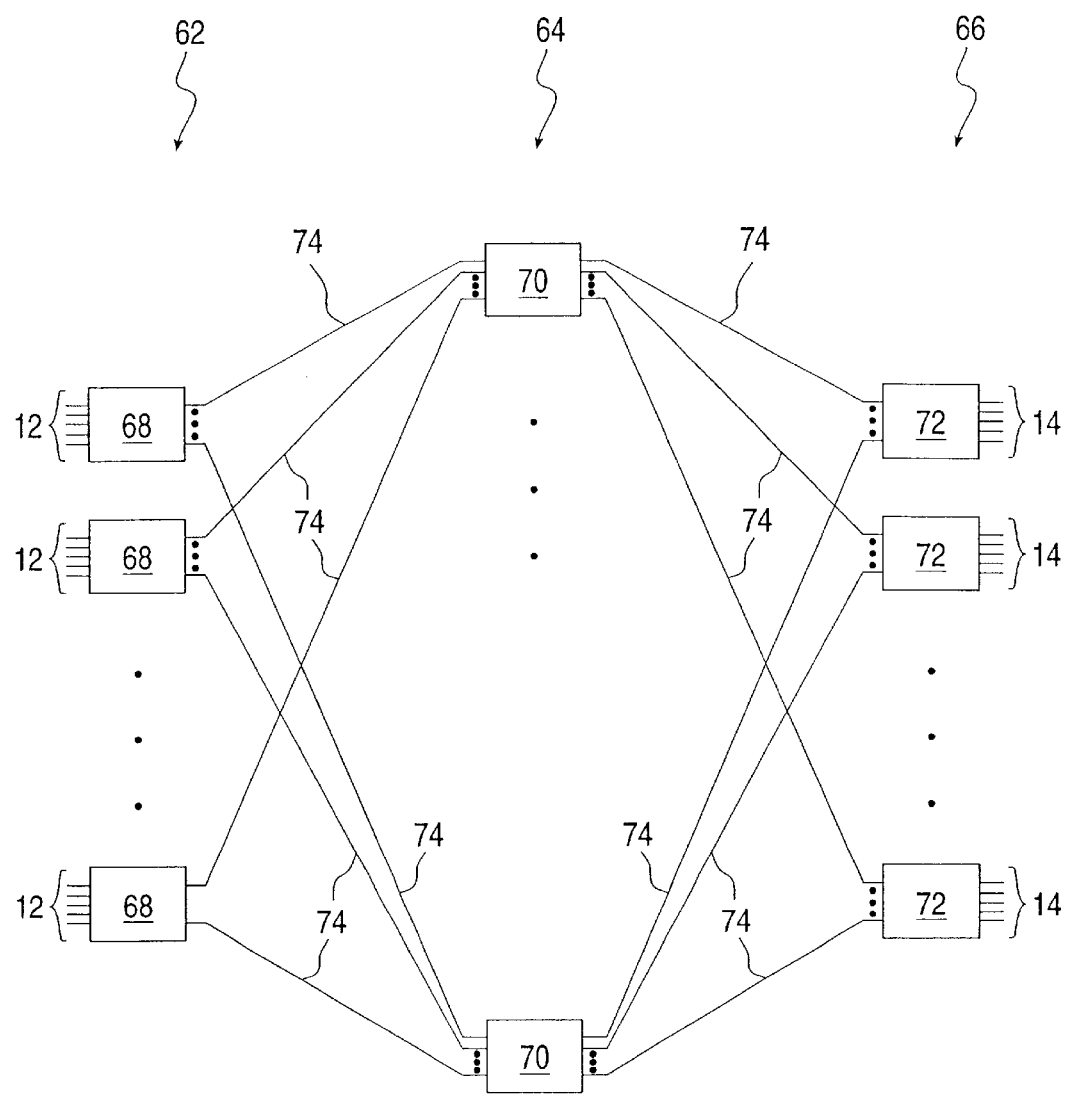
FIG. 9 shows the architecture of a CLOS network.

To connect a large number of input waveguides to a large number of output waveguides, a CLOS network often is used, as described by R. A. Spanke in "Architectures for guided wave optical space switching systems", *IEEE Communications Magazine*, vol. 25 no. 5 (1987) pp. 42–48. FIG. 9 shows a three stage CLOS network for connecting N input waveguides 12 to N output waveguides 14 via a first stage 62 that includes r n×m subnetworks 68, a second stage 64 that includes m r×r subnetworks 70, and a third stage 66 that includes r m×n subnetworks 72, where nr=N and m≧2n−1. Stages 62, 64 and 66 are interconnected by intermediate waveguides 74, as shown. Subnetworks 68, 70 and 72 could be classical tree networks or tree networks of the present invention. The worst case crosstalk of a three stage CLOS network based on prior art splitters and combiners is $\Delta^2(\log_2 n + \log_2 m + \log_2 r)$. It can be shown that a three stage CLOS network, based on 1×2 splitters and 2×1 combiners that have passive all-pass states, has a worst case crosstalk of only $\Delta^2(6-2/r-4/n)$.

While the invention has been described with respect to a limited number of embodiments, it will be appreciated that many variations, modifications and other applications of the invention may be made.

What is claimed is:

1. An optical switch network comprising:
  (a) $N=2^j$ switch input waveguides, where j is an integer greater than 1;
  (b) N switch output waveguides;
  (c) a branching subnetwork including a plurality of successive branching cascades, each said branching cascade including a plurality of 1×2 splitters, each said 1×2 splitter of said each branching cascade connecting a branching cascade input waveguide of said each branching cascade to two branching cascade output waveguides of said each branching cascade, said switch input waveguides serving as said branching cascade input waveguides of a first of said branching cascades, said branching cascade output waveguides of each said branching cascade other than a last said branching cascade serving as said branching cascade input waveguides of a successor said branching cascade to said each branching cascade other than said last branching cascade, at least some of said branching cascade output waveguides of each said branching cascade crossing each other so that said branching cascade output waveguides of said each branching cascade emerge from said each branching cascade in a k-th inserted bit order relative to said branching cascade input waveguides of said each branching cascade, where k is an integer greater than j; and
  (d) a combining subnetwork of 2×1 combiners for connecting said branching cascade output waveguides of said last branching cascade to said N switch output waveguides, said branching cascade output waveguides of said last branching cascade being connected directly to respective said 2×1 combiners.

2. The optical switch network of claim 1, wherein said combining subnetwork includes a plurality of successive combining cascades, each said combining cascade including a subplurality of said 2×1 combiners, each said 2×1 combiner of said each combining cascade connecting two combining cascade input waveguides of said each combining cascade to one combining cascade output waveguide of said each combining cascade, said switch output waveguides serving as said combining cascade output waveguides of a last of said combining cascades, said combining cascade input waveguides of each said combining cascade other than a first said combining cascade serving as said combining cascade output waveguides of a predecessor said combining cascade to said each combining cascade other than said first combining cascade, said combining cascade input waveguides of each said combining cascade entering said each combining cascade in a least significant inserted bit order relative to said combining cascade output waveguides of said each combining cascade, said branching cascade output waveguides of said last branching cascade serving as said combining cascade input waveguides of said first combining cascade.

3. The optical switch network of claim 1, fabricated on a face of a circular wafer.

4. The optical switch network of claim 3, wherein N is at least 8 and wherein said circular wafer has a diameter of at most about 4 inches.

5. The optical switch network of claim 4, wherein N is at least 16.

6. The optical switch network of claim 3, wherein said combining subnetwork is radially beyond said cascades.

7. The optical switch network of claim 1, wherein k=j+1.

8. The optical switch network of claim 1, wherein, in at least one of said branching cascades, at least a portion of said branching cascade output waveguides is crossed by at least one dummy waveguide.

9. The optical switch network of claim 1, wherein each said splitter and each said combiner has an extinction ratio substantially equal to a fraction $\Delta$, the optical switch network having a worst case crosstalk of at most about $\Delta^2(2-2/N)$.

10. An optical switch supernetwork comprising:
(a) R input waveguides, where R is an integer at least as great as 16;
(b) R output waveguides; and
(c) a plurality of optical switches connecting said R input waveguides to said R output waveguides according to a CLOS architecture including:
(i) a first stage including N n×m networks of said switches,
(ii) a second stage including m N×N networks of said switches, at least one of said N×N networks being the optical switch network of claim 1, and
(iii) a third stage including N m×n networks of said switches,
wherein n is an integer such that R is a product of n and N and m is an integer at least as great as 2n−1, each said switch having an extinction ratio substantially equal to a fraction $\Delta$, the optical switch supernetwork having a worst case crosstalk of at most about $\Delta^2(6-2/N-4/n)$.

11. An optical switch network comprising:
(a) $N=2^j$ switch input waveguides, where j is an integer greater than 1;
(b) N switch output waveguides;
(c) a branching subnetwork of 1×2 splitters; and
(d) a combining subnetwork connected to said switch input waveguides via said branching subnetwork, said combining subnetwork including a plurality of successive combining cascades, each said combining cascade including a plurality of 2×1 combiners, each said 2×1 combiner of said each combining cascade connecting two combining cascade input waveguides of said each combining cascade to a combining cascade output waveguide of said each combining cascade, said combining cascade input waveguides of a first said combining cascade being connected directly to respective said 1×2 splitters of said branching subnetwork, said combining cascade input waveguides of each said combining cascade other than said first combining cascade serving as said combining cascade output waveguides of a predecessor said combining cascade to said each combining cascade other than said first combining cascade, said switch output waveguides serving as said combining cascade output waveguides of a last of said combining cascades, at least some of said combining cascade input waveguides of each said combining cascade crossing each other so that said combining cascade input waveguides of said each combining cascade enter said each combining cascade in a k-th inserted bit order relative to said combining cascade output waveguides of said each combining cascade, where k is an integer greater than j.

12. The optical switch network of claim 9, wherein k=j+1.

13. The optical switch network of claim 11, wherein each said splitter and each said combiner has an extinction ratio substantially equal to a fraction $\Delta$, the optical switch network having a worst case crosstalk of at most about $\Delta^2(2-2/N)$.

14. An optical switch supernetwork comprising:
(a) R input waveguides, where R is an integer at least as great as 16;
(b) R output waveguides; and
(c) a plurality of optical switches connecting said R input waveguides to said R output waveguides according to a CLOS architecture including:
(i) a first stage including N n×m networks of said switches,
(ii) a second stage including m N×N networks of said switches, at least one of said N×N networks being the optical switch network of claim 9, and
(iii) a third stage including N m×n networks of said switches,
wherein n is an integer such that R is a product of n and N and m is an integer at least as great as 2n−1, each said switch having an extinction ratio substantially equal to a fraction $\Delta$, the optical switch supernetwork having a worst case crosstalk of at most about $\Delta^2(6-2/N-4/n)$.

15. An optical switch network comprising:
(a) P switch input waveguides, P being an integer greater than 2;
(b) Q switch output waveguides, Q being an integer greater than 2;
(c) a branching subnetwork including a plurality of successive branching cascades, each said branching cascade including a plurality of 1×2 splitters, each said 1×2 splitter of said each branching cascade connecting a branching cascade input waveguide of said each branching cascade to two branching cascade output waveguides of said each branching cascade, said switch input waveguides serving as said branching cascade input waveguides of a first of said branching cascades, said branching cascade output waveguides of each said branching cascade other than a last said branching cascade serving as said branching cascade input waveguides of a successor said branching cascade to said each branching cascade other than said last branching cascade, at least some of said branching cascade output waveguides of each said branching cascade crossing each other so that said branching cascade output waveguides of said each branching cascade emerge from said each branching cascade in a k-th inserted bit order relative to said branching cascade input waveguides of said each branching cascade, where k is an integer greater than a smallest integer j such that $2^j$ is at least as great as a larger of P and Q; and (d) a combining subnetwork of 2×1 combiners for connecting said branching cascade output waveguides of said last branching cascade to said Q switch output waveguides, said branching cascade output waveguides of said last branching cascade being connected directly to respective said 2×1 combiners.

16. The optical switch network of claim 15, wherein k=j+1.

17. The optical switch network of claim 15, wherein each said splitter and each said combiner has an extinction ratio substantially equal to a fraction Δ, the optical switch network having a worst case crosstalk of at most about $\Delta^2(2-2/L)$, where L is the smaller of P and Q.

18. An optical switch supernetwork comprising:
(a) N input waveguides, where N is an integer at least as great as 16;
(b) N output waveguides; and
(c) a plurality of optical switches connecting said N input waveguides to said N output waveguides according to a CLOS architecture including:
  (i) a first stage including R P×Q networks of said switches, at least one of said P×Q networks being the optical switch network of claim 11,
  (ii) a second stage including Q R×R networks of said switches, and
  (iii) a third stage including R Q×P networks of said switches,
wherein Q is at least as great as 2P−1, wherein r is an integers such that N is a product of P and R, each said switch having an extinction ratio substantially equal to a fraction Δ, the optical switch supernetwork having a worst case crosstalk of at most about $\Delta^2(6-2/R-4/P)$.

19. An optical switch supernetwork comprising:
(a) N input waveguides, where N is an integer at least as great as 16;
(b) N output waveguides; and
(c) a plurality of optical switches connecting said N input waveguides to said N output waveguides according to a CLOS architecture including:
  (i) a first stage including R Q×P networks of said switches,
  (ii) a second stage including P R×R networks of said switches, and
  (iii) a third stage including R P×Q networks of said switches, at least one of said P×Q networks being the optical switch network of claim 11,
wherein P is an integer at least as great as 2Q−1, wherein R is an integer such that N is a product of Q and R, each said switch having an extinction ratio substantially equal to a fraction Δ, the optical switch supernetwork having a worst case crosstalk of at most about $\Delta^2(6-2/R-4/Q)$.

20. An optical switch network comprising:
(a) P switch input waveguides, P being an integer greater than 2;
(b) Q switch output waveguides, Q being an integer greater than 2;
(c) a branching subnetwork of 1×2 splitters; and
(d) a combining subnetwork connected to said switch input waveguides via said branching subnetwork, said combining subnetwork including a plurality of successive combining cascades, each said combining cascade including a plurality of 2×1 combiners, each said 2×1 combiner of said each combining cascade connecting two combining cascade input waveguides of said each combining cascade to a combining cascade output waveguide of said each combining cascade, said combining cascade input waveguides of a first said combining cascade being connected directly to respective said 2×1 splitters of said branching subnetwork, said combining cascade input waveguides of each said combining cascade other than said first said combining cascade serving as said combining cascade output waveguides of a predecessor said combining cascade to said each combining cascade other than said first combining cascade, said switch output waveguides serving as said combining cascade output waveguides of a last of said combining cascades, at least some of said combining cascade input waveguides of each said combining cascade crossing each other so that said combining cascade input waveguides of said each combining cascade enter said each combining cascade in a k-th inserted bit order relative to said combining cascade output waveguides of said each combining cascade, where k is an integer greater than a smallest integer j such that $2^j$ is at least as great as a larger of P and Q.

21. The optical switch network of claim 20, wherein k=j+1.

22. An optical switch supernetwork comprising:
(a) N input waveguides, where N is an integer at least as great as 16;
(b) N output waveguides; and
(c) a plurality of optical switches connecting said N input waveguides to said N output waveguides according to a CLOS architecture including:
  (i) a first stage including R P×Q networks of said switches, at least one of said P×Q networks being the optical switch network of claim 13,
  (ii) a second stage including Q R×R networks of said switches, and
  (iii) a third stage including R Q×P networks of said switches,
wherein Q is at least as great as 2P−1, wherein r is an integers such that N is a product of P and R, each said switch having an extinction ratio substantially equal to a fraction Δ, the optical switch supernetwork having a worst case crosstalk of at most about $\Delta^2(6-2/R-4/P)$.

23. An optical switch supernetwork comprising:
(a) N input waveguides, where N is an integer at least as great as 16;
(b) N output wave guides; and
(c) a plurality of optical switches connecting said N input waveguides to said N output waveguides according to a CLOS architecture including:
  (i) a first stage including R Q×P networks of said switches,
  (ii) a second stage including P R×R networks of said switches, and
  (iii) a third stage including R P×Q networks of said switches, at least one of said P×Q networks being the optical switch network of claim 13,
wherein P is an integer at least as great as 2Q−1, wherein R is an integer such that N is a product of Q and R, each said switch having an extinction ratio substantially equal to a fraction Δ, the optical switch supernetwork having a worst case crosstalk of at most about $\Delta^2(6-2/R-4/Q)$.

24. The optical switch network of claim 20, wherein each said splitter and each said combiner has an extinction ratio substantially equal to a fraction Δ, the optical switch network having a worst case crosstalk of at most about $\Delta^2(2-2/L)$, where L is the smaller of P and Q.

25. An optical switch network comprising:
    (a) $N=2^j$ switch input waveguides, where j is an integer greater than 1;
    (b) N switch output waveguides;
    (c) a branching subnetwork including a plurality of successive branching cascades, each said branching cascade including a plurality of 1×2 splitters, each said 1×2 splitter of said each branching cascade connecting a branching cascade input waveguide of said each branching cascade to two branching cascade output waveguides of said each branching cascade, said switch input waveguides serving as said branching cascade input waveguides of a first of said branching cascades, said branching cascade output waveguides of each said branching cascade other than a last said branching cascade serving as said branching cascade input waveguides of a successor said branching cascade to said each branching cascade other than said last branching cascade, at least some of said branching cascade output waveguides of each said branching cascade crossing each other so that said branching cascade output waveguides of said each branching cascade that are connected to a common said switch input waveguide emerge from said each branching cascade at least N said branching cascade output waveguides of said each branching cascade apart; and
    (d) a combining subnetwork of 2×1 combiners for connecting said branching cascade output waveguides of said last branching cascade to said N switch output waveguides, said branching cascade output waveguides of said last branching cascade being connected directly to respective said 2×1 combiners.

26. The optical switch network of claim 25, wherein said combining subnetwork includes a plurality of successive combining cascades, each said combining cascade including a subplurality of said 2×1 combiners, each said 2×1 combiner of said each combining cascade connecting two combining cascade input waveguides of said each combining cascade to one combining cascade output waveguide of said each combining cascade, said switch output waveguides serving as said combining cascade output waveguides of a last of said combining cascades, said combining cascade input waveguides of each said combining cascade other than a first said combining cascade serving as said combining cascade output waveguides of a predecessor said combining cascade to said each combining cascade other than said first combining cascade, said combining cascade input waveguides of each said combining cascade that are connected to a common said switch output waveguide entering said each combining cascade mutually adjacent, said branching cascade output waveguides of said last branching cascade serving as said combining cascade input waveguides of said first combining cascade.

27. The optical switch of claim 25, wherein said branching cascade output waveguides of said each branching cascade that are connected to a common said switch input waveguide emerge from said each branching cascade N said branching cascade output waveguides of said each branching cascade apart.

28. The optical switch network of claim 25, wherein each said splitter and each said combiner has an extinction ratio substantially equal to a fraction Δ, the optical switch network having a worst case crosstalk of at most about $\Delta^2(2-2/N)$.

29. An optical switch supernetwork comprising:
    (a) R input waveguides, where R is an integer at least as great as 16;
    (b) R output waveguides; and
    (c) a plurality of optical switches connecting said R input waveguides to said R output waveguides according to a CLOS architecture including:
        (i) a first stage including N n×m networks of said switches,
        (ii) a second stage including m N×N networks of said switches, at least one of said N×N networks being the optical switch network of claim 25, and
        (iii) a third stage including N m×n networks of said switches,
    wherein n is an integer such that R is a product of n and N and m is an integer at least as great as 2n−1, each said switch having an extinction ratio substantially equal to a fraction Δ, the optical switch supernetwork having a worst case crosstalk of at most about $\Delta^2(6-2/N-4/n)$.

30. An optical switch network comprising:
    (a) $N=2^j$ switch input waveguides, where j is an integer greater than 1;
    (b) N switch output waveguides;
    (c) a branching subnetwork of 1×2 splitters; and
    (d) a combining subnetwork connected to said switch input waveguides via said branching subnetwork, said combining subnetwork including a plurality of successive combining cascades, each said combining cascade including a plurality of 2×1 combiners, each said 2×1 combiner of said each combining cascade connecting two combining cascade input waveguides of said each combining cascade to a combining cascade output waveguide of said each combining cascade, said combining cascade input waveguides of a first said combining cascade being connected directly to respective said 1×2 splitters of said branching subnetwork, said combining cascade input waveguides of each said combining cascade other than said first said combining cascade serving as said combining cascade output waveguides of a predecessor said combining cascade to said each combining cascade other than said first combining cascade, said switch output waveguides serving as said combining cascade output waveguides of a last of said combining cascades, at least some of said combining cascade input waveguides of each said combining cascade crossing each other so that said combining cascade input waveguides of said each combining cascade that are connected to a common said switch output waveguide enter said each combining cascade at least N said combining cascade output waveguides of said each combining cascade apart.

31. The optical switch network of claim 30, wherein said combining cascade input waveguides of said each combining cascade that are connected to a common said switch output waveguide enter said each combining cascade N said combining cascade output waveguides of said each combining cascade apart.

32. The optical switch network of claim 30, wherein each said splitter and each said combiner has an extinction ratio substantially equal to a fraction Δ, the optical switch network having a worst case crosstalk of at most about $\Delta^2(2-2/N)$.

33. An optical switch supernetwork comprising:
    (a) R input waveguides, where R is an integer at least as great as 16;
    (b) R output waveguides; and (c) a plurality of optical switches connecting said R input waveguides to said R output waveguides according to a CLOS architecture including:
  (i) a first stage including N n×m networks of said switches,
  (ii) a second stage including m N×N networks of said switches, at least one of said N×N networks being the optical switch network of claim 18, and
  (iii) a third stage including N m×n networks of said switches, wherein n is an integer such that R is a product of n and N and m is an integer at least as great as 2n−1, each said switch having an extinction ratio substantially equal to a fraction Δ, the optical switch supernetwork having a worst case crosstalk of at most about $\Delta^2(6-2/N-4/n)$.

34. An optical switch network comprising:
(a) P switch input waveguides, P being an integer greater than 2;
(b) Q switch output waveguides, Q being an integer greater than 2;
(c) a branching subnetwork including a plurality of successive branching cascades, each said branching cascade including a plurality of 1×2 splitters, each said 1×2 splitter of said each branching cascade connecting a branching cascade input waveguide of said each branching cascade to two branching cascade output waveguides of said each branching cascade, said switch input waveguides serving as said branching cascade input waveguides of a first of said branching cascades, said branching cascade output waveguides of each said branching cascade other than a last said branching cascade serving as said branching cascade input waveguides of a successor said branching cascade to said each branching cascade other than said last branching cascade, at least some of said branching cascade output waveguides of each said branching cascade crossing each other so that said branching cascade output waveguides of said each branching cascade that are connected to a common said switch input waveguide emerge from said each branching cascade at least P said branching cascade output waveguides of said each branching cascade apart; and
(d) a combining subnetwork of 2×1 combiners for connecting said branching cascade output waveguides of said last branching cascade to said Q switch output waveguides, said branching cascade output waveguides of said last branching cascade being connected directly to respective said 2×1 combiners.

35. The optical switch network of claim 34, wherein said branching cascade output waveguides of said each branching cascade that are connected to a common said switch input waveguide emerge from said each branching cascade P said branching cascade output waveguides of said each branching cascade apart.

36. The optical switch network of claim 34, wherein each said splitter and each said combiner has an extinction ratio substantially equal to a fraction Δ, the optical switch network having a worst case crosstalk of at most about $\Delta^2(2-2/L)$, where L is the smaller of P and Q.

37. An optical switch supernetwork comprising:
(a) N input waveguides, where N is an integer at least as great as 16;
(b) N output waveguides; and
(c) a plurality of optical switches connecting said N input waveguides to said N output waveguides according to a CLOS architecture including:
  (i) a first stage including R P×Q networks of said switches, at least one of said P×Q networks being the optical switch network of claim 20,
  (ii) a second stage including Q R×R networks of said switches, and
  (iii) a third stage including R Q×P networks of said switches, wherein Q is at least as great as 2P−1, wherein r is an integers such that N is a product of P and R, each said switch having an extinction ratio substantially equal to a fraction Δ, the optical switch supernetwork having a worst case crosstalk of at most about $\Delta^2(6-2/R-4/P)$.

38. An optical switch supernetwork comprising:
(a) N input waveguides, where N is an integer at least as great as 16;
(b) N output waveguides; and
(c) a plurality of optical switches connecting said N input waveguides to said N output waveguides according to a CLOS architecture including:
  (i) a first stage including R Q×P networks of said switches,
  (ii) a second stage including P R×R networks of said switches, and
  (iii) a third stage including R P×Q networks of said switches, at least one of said P×Q networks being the optical switch network of claim 20, wherein P is an integer at least as great as 2Q−1, wherein R is an integer such that N is a product of Q and R, each said switch having an extinction ratio substantially equal to a fraction Δ, the optical switch supernetwork having a worst case crosstalk of at most about $\Delta^2(6-2/R-4/Q)$.

39. An optical switch network comprising:
(a) P switch input waveguides, P being an integer greater than 2;
(b) Q switch output waveguides, Q being an integer greater than 2;
(c) a branching subnetwork of 1×2 splitters; and
(d) a combining subnetwork connected to said switch input waveguides via said branching subnetwork, said combining subnetwork including a plurality of successive combining cascades, each said combining cascade including a plurality of 2×1 combiners, each said 2×1 combiner of said each combining cascade connecting two combining cascade input waveguides of said each combining cascade to a combining cascade output waveguide of said each combining cascade, said combining cascade input waveguides of a first said combining cascade being connected directly to respective said 1×2 splitters of said branching subnetwork, said combining cascade input waveguides of each said combining cascade other than a first said combining cascade serving as said combining cascade output waveguides of a predecessor said combining cascade to said each combining cascade other than said first combining cascade, said switch output waveguides serving as aid combining cascade output waveguides of a last of said combining cascades, at least some of said combining cascade input waveguides of each said combining cascade crossing each other so that said combining cascade input waveguides of said each combining cascade that are connected to a common said switch output waveguide enter said each combining cascade at least Q said combining cascade input waveguides of said each combining cascade apart.

40. The optical switch network of claim 39, wherein said combining cascade input waveguides of said each combining cascade that are connected to a common said switch output waveguide enter said each combining cascade Q said combining cascade input waveguides of said each combining cascade apart.

41. The optical switch network of claim 39, wherein each said splitter and each said combiner has an extinction ratio substantially equal to a fraction $\Delta$, the optical switch network having a worst case crosstalk of at most about $\Delta^2(2-2/L)$, where L is the smaller of P and Q.

42. An optical switch supernetwork comprising:
  (a) N input waveguides, where N is an integer at least as great as 16;
  (b) N output waveguides; and
  (c) a plurality of optical switches connecting said N input waveguides to said N output waveguides according to a CLOS architecture including:
    (i) a first stage including R P×Q networks of said switches, at least one of said P×Q networks being the optical switch network of claim 39,
    (ii) a second stage including Q R×R networks of said switches, and
    (iii) a third stage including R Q×P networks of said switches,
wherein Q is at least as great as 2P−1, wherein r is an integers such that N is a product of P and R, each said switch having an extinction ratio substantially equal to a fraction $\Delta$, the optical switch supernetwork having a worst case crosstalk of at most about $\Delta^2(6-2/R-4/P)$.

43. An optical switch supernetwork comprising:
  (a) N input waveguides, where N is an integer at least as great as 16;
  (b) N output waveguides; and
  (c) a plurality of optical switches connecting said N input waveguides to said N output waveguides according to a CLOS architecture including:
    (i) a first stage including R Q×P networks of said switches,
    (ii) a second stage including P R×R networks of said switches, and
    (iii) a third stage including R P×Q networks of said switches, at least one of said P×Q networks being the optical switch network of claim 22,
wherein P is an integer at least as great as 2Q−1, wherein R is an integer such that N is a product of Q and R, each said switch having an extinction ratio substantially equal to a fraction $\Delta$, the optical switch supernetwork having a worst case crosstalk of at most about $\Delta^2(6-2/R-4/Q)$.

* * * * *